US011973655B2

(12) United States Patent
Gudipati et al.

(10) Patent No.: US 11,973,655 B2
(45) Date of Patent: Apr. 30, 2024

(54) SDL CACHE FOR O-RAN

(71) Applicant: VMware LLC, Palo Alto, CA (US)

(72) Inventors: Aditya Gudipati, Sunnyvale, CA (US); Amit Singh, Woodside, CA (US)

(73) Assignee: VMware LLC, Palo Alto, CA (US)

(*) Notice: Subject to any disclaimer, the term of this patent is extended or adjusted under 35 U.S.C. 154(b) by 207 days.

(21) Appl. No.: 17/376,835

(22) Filed: Jul. 15, 2021

(65) Prior Publication Data

US 2022/0286939 A1 Sep. 8, 2022

Related U.S. Application Data

(60) Provisional application No. 63/180,627, filed on Apr. 27, 2021, provisional application No. 63/176,859, (Continued)

(51) Int. Cl.
*H04L 41/122* (2022.01)
*G06F 8/60* (2018.01)
(Continued)

(52) U.S. Cl.
CPC .............. *H04L 41/122* (2022.05); *G06F 8/60* (2013.01); *G06F 9/3877* (2013.01);
(Continued)

(58) Field of Classification Search
CPC ........ G06F 8/60; G06F 9/3877; G06F 9/4411; G06F 9/45533; G06F 9/45545;
(Continued)

(56) References Cited

U.S. PATENT DOCUMENTS 6,504,818 B1   1/2003 Levine
7,417,947 B1   8/2008 Marques et al.
(Continued)

FOREIGN PATENT DOCUMENTS

CN    114449459 A    5/2022
JP    2017516424 A   6/2017
(Continued)

OTHER PUBLICATIONS

R. Schmidt and N. Nikaein, "RAN Engine: Service-Oriented RAN Through Containerized Micro-Services," in IEEE Transactions on Network and Service Management, vol. 18, No. 1, pp. 469-481, Mar. 2021, doi: 10.1109/TNSM.2021.3057642. (Year: 2021).*
(Continued)

*Primary Examiner* — Eric T Oberly
(74) *Attorney, Agent, or Firm* — Quarles & Brady LLP

(57) ABSTRACT

Some embodiments provide a method of performing control plane operations in a radio access network (RAN). The method deploys several machines on a host computer. On each machine, the method deploys a control plane application to perform a control plane operation. The method also configures on each machine a RAN intelligent controller (RIC) SDK to serve as an interface between the control plane application on the same machine and a set of one or more elements of the RAN. In some embodiments, the RIC SDK on each machine includes a set of network connectivity processes that establish network connections to the set of RAN elements for the control plane application. These RIC SDK processes allow the control plane application on their machine to forego having the set of network connectivity processes. In some embodiments, the set of network connectivity processes of each RIC SDK of each machine establishes and maintains network connections between the machine and the set of RAN elements used by the control
(Continued)

plane application of the machine, and handles data packet transport to and from the set of RAN elements for the control plane application.

20 Claims, 11 Drawing Sheets

Related U.S. Application Data filed on Apr. 19, 2021, provisional application No. 63/157,351, filed on Mar. 5, 2021, provisional application No. 63/157,600, filed on Mar. 5, 2021.

(51) Int. Cl.
| | |
|---|---|
| *G06F 9/38* | (2018.01) |
| *G06F 9/4401* | (2018.01) |
| *G06F 9/455* | (2018.01) |
| *G06F 9/48* | (2006.01) |
| *G06F 9/54* | (2006.01) |
| *G06F 11/34* | (2006.01) |
| *G06F 30/331* | (2020.01) |
| *G06N 20/00* | (2019.01) |
| *H04B 7/0452* | (2017.01) |
| *H04L 41/40* | (2022.01) |
| *H04L 43/10* | (2022.01) |
| *H04L 69/324* | (2022.01) |
| *H04W 8/18* | (2009.01) |
| *H04W 8/20* | (2009.01) |
| *H04W 12/037* | (2021.01) |
| *H04W 12/08* | (2021.01) |
| *H04W 24/02* | (2009.01) |
| *H04W 28/06* | (2009.01) |
| *H04W 28/086* | (2023.01) |
| *H04W 28/16* | (2009.01) |
| *H04W 40/24* | (2009.01) |
| *H04W 48/14* | (2009.01) |
| *H04W 72/02* | (2009.01) |
| *H04W 72/044* | (2023.01) |
| *H04W 72/0453* | (2023.01) |
| *H04W 72/20* | (2023.01) |
| *H04W 72/29* | (2023.01) |
| *H04W 72/51* | (2023.01) |
| *H04W 72/52* | (2023.01) |
| *H04W 36/10* | (2009.01) |
| *H04W 84/04* | (2009.01) |

(52) U.S. Cl.
CPC ........ *G06F 9/4411* (2013.01); *G06F 9/45533* (2013.01); *G06F 9/45545* (2013.01); *G06F 9/4881* (2013.01); *G06F 9/541* (2013.01); *G06F 9/544* (2013.01); *G06F 9/546* (2013.01); *G06F 11/3409* (2013.01); *G06F 30/331* (2020.01); *G06N 20/00* (2019.01); *H04B 7/0452* (2013.01); *H04L 41/40* (2022.05); *H04L 43/10* (2013.01); *H04L 69/324* (2013.01); *H04W 8/18* (2013.01); *H04W 8/186* (2013.01); *H04W 8/20* (2013.01); *H04W 12/037* (2021.01); *H04W 12/08* (2013.01); *H04W 24/02* (2013.01); *H04W 28/06* (2013.01); *H04W 28/0865* (2023.05); *H04W 28/16* (2013.01); *H04W 40/246* (2013.01); *H04W 48/14* (2013.01); *H04W 72/02* (2013.01); *H04W 72/0453* (2013.01); *H04W 72/046* (2013.01); *H04W 72/20* (2023.01); *H04W 72/29* (2023.01); *H04W 72/51* (2023.01); *H04W 72/52* (2023.01); *G06F 9/45558* (2013.01); *G06F 2009/4557* (2013.01); *G06F 2009/45579* (2013.01); *G06F 2009/45583* (2013.01); *G06F 2009/45595* (2013.01); *H04L 2212/00* (2013.01); *H04W 36/10* (2013.01); *H04W 84/042* (2013.01)

(58) Field of Classification Search
CPC .... G06F 9/45558; G06F 9/4881; G06F 9/541; G06F 9/544; G06F 9/546; G06F 11/3409; G06F 30/331; G06F 2009/4557; G06F 2009/45579; G06F 2009/45595; G06F 2009/45583; G06N 20/00; H04B 7/0452; H04L 41/40; H04L 41/122; H04L 43/10; H04L 69/234; H04L 2212/00; H04W 8/18; H04W 8/186; H04W 8/20; H04W 12/037; H04W 12/08; H04W 24/02; H04W 28/06; H04W 28/0865; H04W 28/16; H04W 36/10; H04W 40/246; H04W 48/14; H04W 72/02; H04W 72/0453; H04W 72/046; H04W 72/20; H04W 72/29; H04W 72/51; H04W 72/52; H04W 84/042

See application file for complete search history.

(56) References Cited

U.S. PATENT DOCUMENTS

| | | | |
|---|---|---|---|
| 9,124,538 B2 | 9/2015 | Koponen et al. | |
| 9,280,319 B2 | 3/2016 | Badawy et al. | |
| 9,438,491 B1 | 9/2016 | Kwok et al. | |
| 9,772,822 B2 | 9/2017 | Narayanan et al. | |
| 10,111,163 B2 | 10/2018 | Vrzic et al. | |
| 10,243,835 B2 | 3/2019 | Wang et al. | |
| 10,447,597 B1 | 10/2019 | Kim et al. | |
| 10,459,754 B2 | 10/2019 | Liu | |
| 10,461,421 B1 | 10/2019 | Tran et al. | |
| 10,555,134 B2 | 2/2020 | Shaw et al. | |
| 10,609,530 B1 | 3/2020 | Patil et al. | |
| 10,708,143 B2 | 7/2020 | Zhang et al. | |
| 10,708,189 B1 | 7/2020 | Agrawal et al. | |
| 10,735,331 B1 | 8/2020 | Li et al. | |
| 10,824,483 B2 | 11/2020 | Gino et al. | |
| 10,834,669 B2 | 11/2020 | Bordeleau et al. | |
| 10,856,217 B1 | 12/2020 | Young et al. | |
| 10,939,369 B2 | 3/2021 | Bordeleau et al. | |
| 11,009,372 B2 | 5/2021 | Klimenko | |
| 11,012,288 B2 | 5/2021 | Kommula et al. | |
| 11,024,144 B2 | 6/2021 | Bordeleau et al. | |
| 11,108,643 B2 | 8/2021 | Kommula et al. | |
| 11,146,964 B2 | 10/2021 | Bordeleau et al. | |
| 11,178,016 B2 | 11/2021 | Kommula et al. | |
| 11,240,113 B2 | 2/2022 | Kommula et al. | |
| 11,246,087 B2 | 2/2022 | Bordeleau et al. | |
| 11,483,762 B2 | 10/2022 | Bordeleau et al. | |
| 11,522,764 B2 | 12/2022 | Kommula et al. | |
| 11,540,287 B2 | 12/2022 | Singh et al. | |
| 2003/0026205 A1 | 2/2003 | Mullendore et al. | |
| 2005/0278501 A1* | 12/2005 | Taguchi | G06F 12/0866 711/3 |
| 2006/0146712 A1 | 7/2006 | Conner et al. | |
| 2007/0100981 A1 | 5/2007 | Adamczyk et al. | |
| 2008/0162637 A1 | 7/2008 | Adamczyk et al. | |
| 2010/0322255 A1 | 12/2010 | Hao et al. | |
| 2011/0202634 A1* | 8/2011 | Kovvali | H04L 69/163 709/219 |
| 2013/0125230 A1 | 5/2013 | Koponen et al. | |
| 2013/0279504 A1 | 10/2013 | Gulati et al. | |
| 2014/0233385 A1 | 8/2014 | Beliveau et al. | |
| 2014/0342712 A1* | 11/2014 | Madhavan | H04L 67/06 455/414.3 |
| 2015/0074264 A1 | 3/2015 | Izhak-Ratzin et al. | |
| 2015/0163117 A1 | 6/2015 | Ambeth et al. | |

(56) References Cited

U.S. PATENT DOCUMENTS

| | | |
|---|---|---|
| 2015/0358654 A1* | 12/2015 | Zhang ............... H04N 21/4305 725/62 |
| 2015/0381486 A1 | 12/2015 | Xiao et al. |
| 2015/0381493 A1 | 12/2015 | Bansal et al. |
| 2016/0335107 A1 | 11/2016 | Behera et al. |
| 2016/0344565 A1 | 11/2016 | Batz et al. |
| 2016/0353465 A1 | 12/2016 | Vrzic et al. |
| 2016/0360408 A1 | 12/2016 | Senarath et al. |
| 2017/0054595 A1 | 2/2017 | Zhang et al. |
| 2017/0085628 A1 | 3/2017 | Mahindra et al. |
| 2017/0093633 A1 | 3/2017 | Chang et al. |
| 2017/0111187 A1 | 4/2017 | Zanier et al. |
| 2017/0142591 A1 | 5/2017 | Vrzic |
| 2017/0250893 A1 | 8/2017 | Duda |
| 2017/0250906 A1 | 8/2017 | MeLampy et al. |
| 2017/0264483 A1 | 9/2017 | Lambeth et al. |
| 2017/0289791 A1 | 10/2017 | Yoo et al. |
| 2017/0330245 A1 | 11/2017 | Guermas et al. |
| 2017/0332212 A1 | 11/2017 | Gage |
| 2017/0332421 A1 | 11/2017 | Sternberg et al. |
| 2018/0088972 A1 | 3/2018 | Kubota et al. |
| 2018/0183866 A1 | 6/2018 | Gunda et al. |
| 2018/0219762 A1 | 8/2018 | Wang et al. |
| 2018/0220276 A1 | 8/2018 | Senarath et al. |
| 2018/0220277 A1 | 8/2018 | Senarath et al. |
| 2018/0248770 A1 | 8/2018 | Regmi et al. |
| 2018/0262365 A1 | 9/2018 | Lee et al. |
| 2018/0270713 A1 | 9/2018 | Park et al. |
| 2018/0270743 A1 | 9/2018 | Callard et al. |
| 2018/0295036 A1 | 10/2018 | Krishnamurthy et al. |
| 2018/0332441 A1 | 11/2018 | Shaw et al. |
| 2018/0368060 A1 | 12/2018 | Kedalagudde et al. |
| 2019/0044755 A1 | 2/2019 | Takajo et al. |
| 2019/0053104 A1 | 2/2019 | Qiao et al. |
| 2019/0058508 A1 | 2/2019 | Yiu |
| 2019/0075082 A1 | 3/2019 | Adam et al. |
| 2019/0104458 A1 | 4/2019 | Svennebring et al. |
| 2019/0114197 A1 | 4/2019 | Gong |
| 2019/0123963 A1 | 4/2019 | Tang et al. |
| 2019/0124704 A1 | 4/2019 | Sun et al. |
| 2019/0150080 A1 | 5/2019 | Davies et al. |
| 2019/0158364 A1 | 5/2019 | Zhang et al. |
| 2019/0159117 A1 | 5/2019 | Kuge et al. |
| 2019/0174573 A1 | 6/2019 | Velev et al. |
| 2019/0187999 A1 | 6/2019 | Lu et al. |
| 2019/0191309 A1 | 6/2019 | Kweon et al. |
| 2019/0200286 A1 | 6/2019 | Usui et al. |
| 2019/0245740 A1 | 8/2019 | Kachhla |
| 2019/0268633 A1 | 8/2019 | Jayawardene et al. |
| 2019/0268973 A1 | 8/2019 | Bull et al. |
| 2019/0280976 A1 | 9/2019 | Wang |
| 2019/0287146 A1 | 9/2019 | Maitland et al. |
| 2019/0289470 A1 | 9/2019 | Vaidya et al. |
| 2019/0320494 A1 | 10/2019 | Jayawardene et al. |
| 2019/0364475 A1* | 11/2019 | Chandramouli ...... H04W 80/10 |
| 2019/0370376 A1 | 12/2019 | Demmon et al. |
| 2019/0373520 A1 | 12/2019 | Sillanpää |
| 2020/0007445 A1 | 1/2020 | Anwer et al. |
| 2020/0053531 A1 | 2/2020 | Myhre et al. |
| 2020/0053545 A1 | 2/2020 | Wong et al. |
| 2020/0067831 A1 | 2/2020 | Spraggins et al. |
| 2020/0077327 A1 | 3/2020 | Duan et al. |
| 2020/0106536 A1 | 4/2020 | Bedekar |
| 2020/0120721 A1 | 4/2020 | Lau et al. |
| 2020/0120724 A1 | 4/2020 | Vaidya et al. |
| 2020/0134620 A1* | 4/2020 | Aiello .................. G06Q 20/389 |
| 2020/0137621 A1 | 4/2020 | Yang et al. |
| 2020/0213360 A1 | 7/2020 | Ojha et al. |
| 2020/0235990 A1 | 7/2020 | Janakiraman et al. |
| 2020/0252142 A1 | 8/2020 | Bedekar |
| 2020/0273314 A1 | 8/2020 | Bordeleau et al. |
| 2020/0275281 A1 | 8/2020 | Bordeleau et al. |
| 2020/0275357 A1 | 8/2020 | Bordeleau et al. |
| 2020/0275358 A1 | 8/2020 | Bordeleau et al. |
| 2020/0275359 A1 | 8/2020 | Bordeleau et al. |
| 2020/0275360 A1 | 8/2020 | Bordeleau et al. |
| 2020/0280615 A1 | 9/2020 | Andersson et al. |
| 2020/0314029 A1 | 10/2020 | Gopinath et al. |
| 2020/0314622 A1 | 10/2020 | Tofighbakhsh et al. |
| 2021/0014912 A1 | 1/2021 | Song et al. |
| 2021/0029580 A1 | 1/2021 | Gupta et al. |
| 2021/0037390 A1* | 2/2021 | Tofighbakhsh ....... H04L 5/0044 |
| 2021/0051490 A1 | 2/2021 | Yanover et al. |
| 2021/0064407 A1 | 3/2021 | Kommula et al. |
| 2021/0064451 A1 | 3/2021 | Kommula et al. |
| 2021/0067416 A1 | 3/2021 | Kommula et al. |
| 2021/0067439 A1 | 3/2021 | Kommula et al. |
| 2021/0224145 A1 | 7/2021 | Warmack |
| 2021/0234803 A1 | 7/2021 | Parekh et al. |
| 2021/0297347 A1 | 9/2021 | Xu et al. |
| 2022/0012645 A1 | 1/2022 | Ying et al. |
| 2022/0014963 A1 | 1/2022 | Yeh et al. |
| 2022/0038902 A1 | 2/2022 | Mueck |
| 2022/0038934 A1 | 2/2022 | Kumar et al. |
| 2022/0104077 A1 | 3/2022 | Jarschel et al. |
| 2022/0159522 A1 | 5/2022 | Cui et al. |
| 2022/0167236 A1 | 5/2022 | Melodia et al. |
| 2022/0167259 A1 | 5/2022 | Cui et al. |
| 2022/0210706 A1 | 6/2022 | Parekh et al. |
| 2022/0210708 A1 | 6/2022 | Parekh et al. |
| 2022/0216600 A1 | 7/2022 | Kumar et al. |
| 2022/0225264 A1 | 7/2022 | Song et al. |
| 2022/0232423 A1 | 7/2022 | Thyagaturu et al. |
| 2022/0237049 A1 | 7/2022 | Wiggers et al. |
| 2022/0240085 A1 | 7/2022 | Long |
| 2022/0253293 A1 | 8/2022 | Pontecorvi et al. |
| 2022/0279421 A1 | 9/2022 | Sivakumar et al. |
| 2022/0279535 A1 | 9/2022 | Tsui |
| 2022/0283832 A1 | 9/2022 | Singh et al. |
| 2022/0283839 A1 | 9/2022 | Srinivasan et al. |
| 2022/0283840 A1 | 9/2022 | Jayavelu et al. |
| 2022/0283841 A1 | 9/2022 | Jayavelu et al. |
| 2022/0283842 A1 | 9/2022 | Singh et al. |
| 2022/0283843 A1 | 9/2022 | Singh |
| 2022/0283882 A1 | 9/2022 | Singh et al. |
| 2022/0286536 A1 | 9/2022 | Singh et al. |
| 2022/0286837 A1 | 9/2022 | Yang et al. |
| 2022/0286840 A1 | 9/2022 | Singh |
| 2022/0286914 A1 | 9/2022 | Gudipati et al. |
| 2022/0286915 A1 | 9/2022 | Gudipati et al. |
| 2022/0286916 A1 | 9/2022 | Yang et al. |
| 2022/0287038 A1 | 9/2022 | Singh et al. |
| 2022/0303831 A1 | 9/2022 | Song et al. |
| 2022/0321414 A1 | 10/2022 | Kim et al. |
| 2022/0342732 A1 | 10/2022 | Subramani Jayavelu et al. |
| 2022/0345417 A1 | 10/2022 | Kasichainula et al. |
| 2022/0407664 A1 | 12/2022 | Wang et al. |
| 2022/0417117 A1 | 12/2022 | Tayeb et al. |
| 2023/0041056 A1 | 2/2023 | Bordeleau et al. |
| 2023/0054483 A1 | 2/2023 | Lee et al. |
| 2023/0069604 A1 | 3/2023 | Subramani et al. |
| 2023/0104129 A1 | 4/2023 | Miriyala et al. |
| 2023/0112127 A1 | 4/2023 | Lee et al. |
| 2023/0112534 A1 | 4/2023 | Chen |
| 2023/0144337 A1 | 5/2023 | Kumar et al. |
| 2023/0189317 A1 | 6/2023 | Swamy et al. |

FOREIGN PATENT DOCUMENTS

| | | |
|---|---|---|
| JP | 2018518927 A | 7/2018 |
| JP | 2018125837 A | 8/2018 |
| WO | 2016159192 A1 | 10/2016 |
| WO | 2016206742 A1 | 12/2016 |
| WO | 2017150642 A1 | 9/2017 |
| WO | 2019129374 A1 | 7/2019 |
| WO | 2019229492 A1 | 12/2019 |
| WO | 2020171957 A1 | 8/2020 |
| WO | 2020242987 A1 | 12/2020 |
| WO | 2021040935 A1 | 3/2021 |
| WO | 2022011862 A1 | 1/2022 |
| WO | 2022156887 A1 | 7/2022 |
| WO | 2022177333 A1 | 8/2022 |

(56) References Cited

FOREIGN PATENT DOCUMENTS

| WO | 2022186883 A1 | 9/2022 |
|----|---------------|--------|
| WO | 2022186912 A1 | 9/2022 |
| WO | 2022194359 A1 | 9/2022 |

OTHER PUBLICATIONS

Bonati, Leonardo, et al., "Open, Programmable, and Virtualized 5G Networks: State-of-the-Art and the Road Ahead," Aug. 25, 2020, 32 pages, retrieved from https://arxiv.org/abs/2005.10027v3. (Year: 2020).*
Blenk, Andreas, et al., "Survey on Network Virtualization Hypervisors for Software Defined Networking", IEEE Communications Surveys & Tutorials, Jan. 27, 2016, 32 pages, vol. 18, No. 1, IEEE.
Non-Published Commonly Owned U.S. Appl. No. 17/376,758, filed Jul. 15, 2021, 50 pages, VMware, Inc.
Non-Published Commonly Owned U.S. Appl. No. 17/376,766, filed Jul. 15, 2021, 50 pages, VMware, Inc.
Non-Published Commonly Owned U.S. Appl. No. 17/376,785, filed Jul. 15, 2021, 50 pages, VMware, Inc.
Non-Published Commonly Owned Related U.S. Appl. No. 17/376,801 with similar specification, filed Jul. 15, 2021, 36 pages, VMware, Inc.
Non-Published Commonly Owned Related U.S. Appl. No. 17/376,817 with similar specification, filed Jul. 15, 2021, 36 pages, VMware, Inc.
Non-Published Commonly Owned U.S. Appl. No. 17/384,475, filed Jul. 23, 2021, 55 pages, VMware, Inc.
Non-Published Commonly Owned U.S. Appl. No. 17/384,476, filed Jul. 23, 2021, 56 pages, VMware, Inc.
Non-Published Commonly Owned U.S. Appl. No. 17/384,777, filed Jul. 25, 2021, 87 pages, VMware, Inc.
Non-Published Commonly Owned U.S. Appl. No. 17/384,778, filed Jul. 25, 2021, 87 pages, VMware, Inc.
Non-Published Commonly Owned U.S. Appl. No. 17/384,779, filed Jul. 25, 2021, 87 pages, VMware, Inc.
Non-Published Commonly Owned U.S. Appl. No. 17/384,780, filed Jul. 25, 2021, 87 pages, VMware, Inc.
Non-Published Commonly Owned U.S. Appl. No. 17/384,781, filed Jul. 25, 2021, 87 pages, VMware, Inc.
Non-Published Commonly Owned U.S. Appl. No. 17/384,782, filed Jul. 25, 2021, 87 pages, VMware, Inc.
Non-Published Commonly Owned U.S. Appl. No. 17/384,784, filed Jul. 25, 2021, 87 pages, VMware, Inc.
Author Unknown, "5G RIC—RAN Intelligent Controller," Jun. 26, 2020, 4 pages, retrieved from http://www.techplayon.com/5g-ric-ran-intelligent-controller/.
Non-Published Commonly Owned U.S. Appl. No. 17/971,590, filed Oct. 22, 2022, 104 pages, VMware, Inc.
Non-Published Commonly Owned U.S. Appl. No. 17/976,788, filed Oct. 29, 2022, 62 pages, VMware, Inc.
Non-Published Commonly Owned International Patent Application PCT/US2022/013427, filed Jan. 21, 2022, 88 pages, VMware, Inc.
Bonati, Leonardo, et al., "Open, Programmable, and Virtualized 5G Networks: State-of-the-Art and the Road Ahead," Aug. 25, 2020, 32 pages, retrieved from https://arxiv.org/abs/2005.10027v3.
Czichy, Thoralf, 5G RAN Optimization Using the O-RAN Software Community's RIC (RAN Intelligent Controller), Open Networking Summit Europe, Sep. 23, 2019, 23 pages, The Linux Foundation, Antwerp, Belgium.
PCT International Search Report and Written Opinion of Commonly Owned International Patent Application PCT/US2022/013427, dated May 11, 2022, 14 pages, International Searching Authority (EPO).
Balasubramanian, Bharath, et al., "RIC: A RAN Intelligent Controller Platform for AI-Enabled Cellular Networks," Apr. 16, 2021, 11 pages, IEEE.
Author Unknown, "Open RAN 101—Role of RAN Intelligent Controller: Why, what, when, how?," Jul. 30, 2020, 8 pages.
Author Unknown, "O-RAN Operations and Maintenance Architecture," O-RAN WG1 OAM-Architecture-v04.00, Month Unknown 2021, 55 pages, O-RAN Alliance.

* cited by examiner

SDL CACHE FOR O-RAN

CLAIM OF BENEFIT TO PRIOR APPLICATIONS

This application claims the benefit of U.S. Provisional Patent Application 63/157,351, filed Mar. 5, 2021; U.S. Provisional Patent Application 63/157,600, filed Mar. 5, 2021; U.S. Provisional Patent Application 63/176,859, filed Apr. 19, 2021; and U.S. Provisional Patent Application 63/180,627, filed Apr. 27, 2021. U.S. Provisional Patent Applications 63/157,351, 63/157,600, 63/176,859, and 63/180,627 are incorporated herein by reference.

BACKGROUND

In telecommunications networks, the Radio Access Network (RAN) performs more and more functions with each iteration of the telecommunications standards. That is, in order to enable the advantages of 5G over previous standards, the 5G RAN performs various additional functions. These RAN functions are situated between user devices and the core network, and are thus often performed at the base stations (e.g., cell towers) where computing power can be limited.

BRIEF SUMMARY

Some embodiments provide a method of performing control plane operations in a radio access network (RAN). The method deploys several machines on a host computer. On each machine, the method deploys a control plane application to perform a control plane operation. The method also configures on each machine a RAN intelligent controller (RIC) SDK (software development kit) to serve as an interface between the control plane application on the same machine and a set of one or more elements of the RAN. The RIC SDK provides a set of connectivity APIs (e.g., a framework) through which applications (e.g., xApps or other control plane or edge applications) can communicate with the distributed near real-time (RT) RIC.

In some embodiments, the RIC SDK on each machine includes a set of network connectivity processes that establish network connections to the set of RAN elements for the control plane application. These RIC SDK processes allow the control plane application on their machine to forego having the set of network connectivity processes. In some embodiments, the set of network connectivity processes of each RIC SDK of each machine establishes and maintains network connections between the machine and the set of RAN elements used by the control plane application of the machine, and handles data packet transport to and from the set of RAN elements for the control plane application.

The control plane application on each machine communicates with the set of RAN elements through high-level API (application program interface) calls that the RAN SDK converts into low-level API calls. In some embodiments, at least a subset of the low-level API calls are specified by a standard specifying body. Also, in some embodiments, the high-level API calls are made in a high-level programming language, while the low-level API calls comprise low-level calls that establish and maintain network connections and pass data packets through these connections.

The set of RAN elements that the RIC SDK connects with the control plane application on its machine include CU (central units) and DU (distributed units) of the RAN in some embodiments. Also, this SDK communicates with the CUs and DUs through the low-level, standard-specified E2 interface, while the control plane application on the machine uses high-level API calls to communicate with the CUs and DUs through the RAN SDK. In some embodiments, the high-level API calls specifying E2 interface operations at a high-level application layer that do not include low-level transport or network operations.

Conjunctively, or alternatively, the set of RAN elements that the RIC SDK connects with the control plane application on its machine include network elements of the RIC. The RIC elements include at least one shared data layer (SDL) element, at least one datapath input/output (I/O) element, and at least one service management element in some embodiments. Through the RIC, the RIC SDK also connects its control plane application to other control plane applications executing on other machines. For instance, some embodiments deploy several RICs to execute on several host computers to implement a distributed RIC that serves as communication interface between the control plane applications.

The method of some embodiments configures a first RIC to receive API calls from at least a first control plane application and to forward the API calls to at least a second control plane application. The first and second control plane applications execute on the same host computer in some embodiments, while they execute on two different computers in other embodiments. In some embodiments where the first RIC and the first control plane application execute on a first host computer, and the second control plane application executes on a second host computer, the method configures the first RIC to forward the API calls from the first control plane application to a second RIC executing on the second computer for the second RIC to forward to the second control plane application.

In some embodiments, the first and second control plane applications are developed by two different application developers that use a common set of RIC APIs to communicate with each other through the distributed RIC. In some of these embodiments, the first RIC add one or more parameters to the API calls as it forwards the API calls from the first control application to the second control application.

The method of some embodiments deploys an SDL cache on the same host computer as a control plane application, and uses this cache to process at least a subset of the SDL storage access requests of the control plane application. In some embodiments, the control plane application and the SDL cache operate on a machine that executes on the host computer. In other embodiments, the SDL cache operates on the same host computer but outside of the machine on which the control plane application executes. In some of these embodiments, multiple control plane applications executing on the same host computer use a common SDL cache on that host computer.

The SDL cache is part of a RIC that executes on the same host computer as the control plane application in some embodiments. In other embodiments, the SDL cache is part of the RIC SDK that executes on the same machine as the control plane application. In either of these embodiments, a synchronizing process of the RIC or the RIC SDK synchronizes the data stored in the SDL cache with the data stored in the SDL storage.

In some embodiments, the SDL storage operates on a different host computer than the host computer on which the control plane application executes, while in other embodiments at least a portion of the SDL storage operates on the same host computer on which the control plane application executes. Also, in some embodiments, the RIC or the RIC SDK forwards SDL access requests from the control plane application to the SDL storage when the RIC SDK cannot process the SDL access requests through the SDL cache. For instance, the RIC or the RIC SDK cannot process SDL access requests through the SDL cache when the SDL cache does not store data requested by the control plane application.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Figure 1:
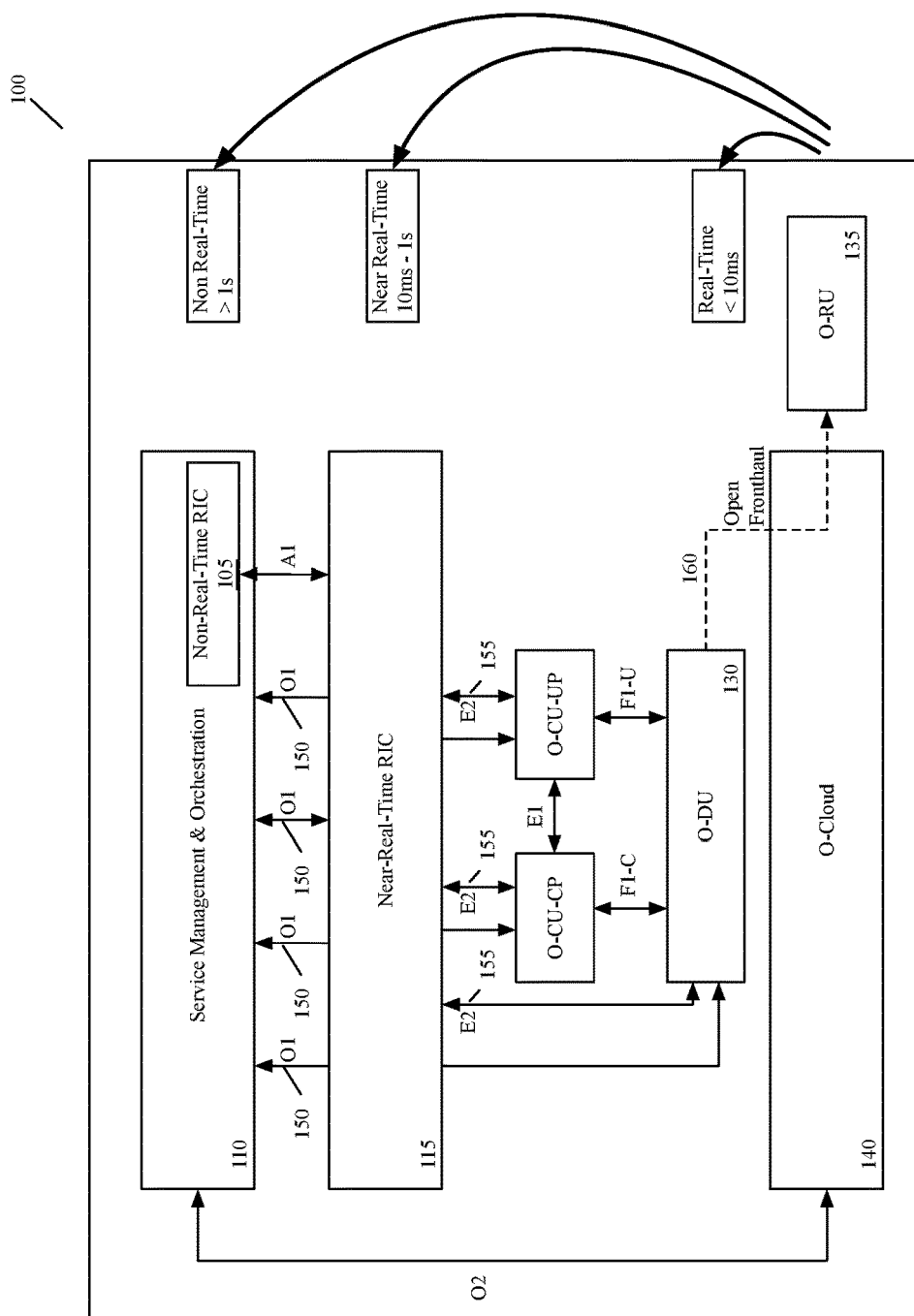
FIG. 1 illustrates an example of O-RAN architecture according to some embodiments.
Figure 1:
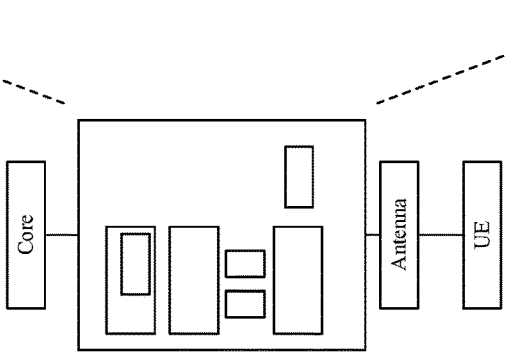

Today, there is a push to have RAN implemented as O-RAN, a standard for allowing interoperability for RAN elements and interfaces. FIG. 1 illustrates an example of O-RAN architecture 100, according to some embodiments. The O-RAN architecture 100 includes a service management and orchestration framework (SMO) 110 with a non-real-time RIC 105, a near real-time RAN intelligent controller (RIC) 115, open control plane central unit (O-CU-CP) 120, open user plane central unit (O-CU-UP) 125, open distributed unit (O-DU) 130, open radio unit (O-RU) 135, and the O-Cloud 140. The O-CU-CP 120, the O-CU-UP 125, and the O-DU 130 may be collectively referred to as the managed functions 120-130 below.

As defined in the standard, the SMO 110 in some embodiments includes an integration fabric that allows the SMO to connect to and manage the RIC 115, the managed functions 120-130, and the O-Cloud 140 via the open interfaces 150. Unlike these elements, the O-RU 135 is not managed by the SMO 110, and is instead managed by the O-DU 130, as indicated by the dashed line 160, in some embodiments. In some embodiments, the O-RU 135 processes and sends radio frequencies to the O-DU 130.

In some embodiments, the managed functions 120-130 are logical nodes that each host a set of protocols. According to the O-RAN standard, for example, the O-CU-CP 120, in some embodiments, include protocols such as radio resource control (RRC) and the control plane portion of packet data convergence protocol (PDCP), while the O-CU-UP 125 includes protocols such as service data adaptation protocol (SDAP), and the user plane portion of packet data convergence protocol (PDCP).

The two RICs are each adapted to specific control loop and latency requirements. The near real-time MC 115 provides programmatic control of open centralized units (O-CUs) and open distributed units (O-DUs) on time cycles of 10 ms to 1 second. The non-real-time RIC (non-RT MC) 105, on the other hand, provides higher layer policies that can be implemented in the RAN either via the near-RT MC or via a direct connection to RAN nodes. The non-RT MC is used for control loops of more than 1 second. Each RIC 105 or 115 serves as a platform on which RAN control applications execute. These applications can be developed by third-party suppliers that are different from the RIC vendors. These applications are referred to as "xApps" (for the near-RT RIC 115) and "rApps" (for the non-RT RIC).

The near real-time RIC 115, in some embodiments, is a logical aggregation of several functions that use data collection and communications over the interfaces 155 in order to control the managed functions 120-130. In some embodiments, the non-real-time RIC 105 uses machine learning and model training in order to manage and optimize the managed functions 120-130. The near RT RIC in some of these embodiments also uses machine learning.

In some embodiments, the O-Cloud 140 is responsible for creating and hosting virtual network functions (VNFs) for use by the RIC 115 and the managed functions 120-130. In some embodiments, the DU is in charge of per-slot decisions of user scheduling and includes RAN scheduler that performs MAC control assistance and user-level tracing. In order to increase computing power available in the cloud (i.e., compared to base stations that typically execute the RAN functions), the RIC is implemented in one or more public and/or private cloud datacenters and implements an improved cloudified RAN scheduler in the cloud, thereby offloading these MAC control assistance and user-level tracing functions from the DU to the RIC. The interfaces 155 in some embodiments enable the RAN to provide inputs to the functions at the RIC, and, at least in some embodiments, receive outputs that have been computed by these functions at the RIC.

Figure 2:
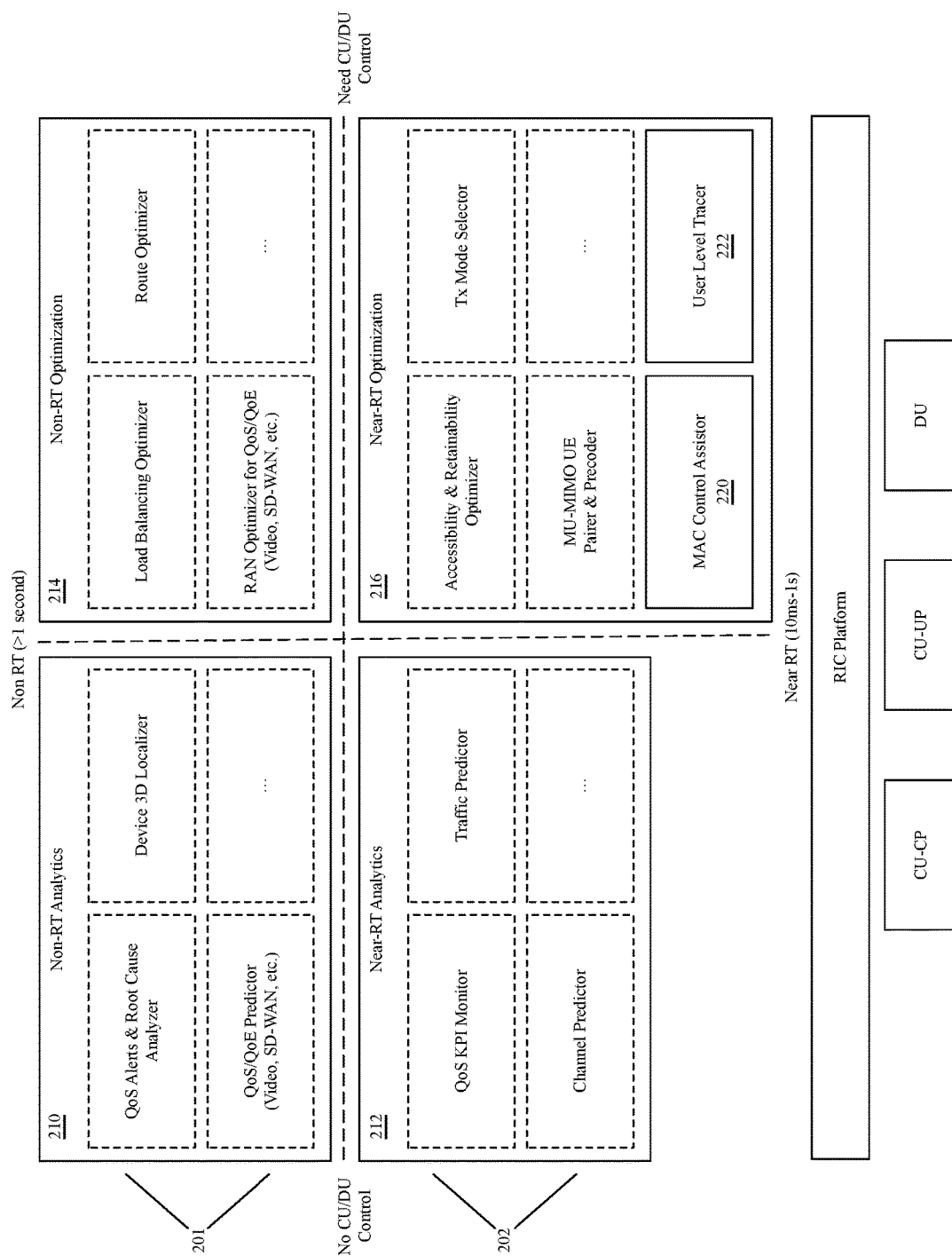
FIG. 2 illustrates an in-depth view of the components of both a non-real-time RIC and a near real-time RIC according to some embodiments.

FIG. 2 illustrates an in-depth view of the components of both a non-real-time RIC 201 and a near real-time RIC 202. Each of the RICs 201 and 202 includes a respective set of analytics functions 210 and 212, and a respective set of optimization functions 214 and 216, which are each illustrated with dashed lines to indicate they are existing components. In addition to these existing components, the near real-time optimization functions 216 includes two new components, the MAC control assistor 220 and user-level tracer 222, illustrated with solid lines to visually differentiate them from the existing components. In some embodiments, these components are part of a larger MIMO component (e.g., along with the MU-MIMO UE pairer and precoder).

In some embodiments, the MAC control assistor 220 can include various functions such as (1) User Equipment (UE)-specific beamforming weight calculation based on UL SRS channel signal reception, (2) UE Radio Frequency (RF) condition prediction, and (3) Multi-User, Multiple Input, Multiple Output (MU-MIMO) pairing suggestion for the MAC scheduler based on the UE-specific beams. For each of these functions, some embodiments expose a report interface (that provides input data for the function to the RIC from the DU) and a control interface (that provides output data for the function to the DU from the RIC).

The user-level tracer 222, in some embodiments, produces L1/L2/L3 level information related to user configuration and traffic performance. This tracing data can be used as inputs to various control algorithms, including the MAC scheduler, parameter setting, etc. The user-level tracer 222 can include tracing operations that can (i) track user behavior in a cell, (ii) track user RF condition, (iii) track user data traffic performance in different layers (MAC, Radio Link Control (RLC), Packet Data Convergence Protocol (PDCP)), and (iv) track user RF resource consumption.

Figure 3:
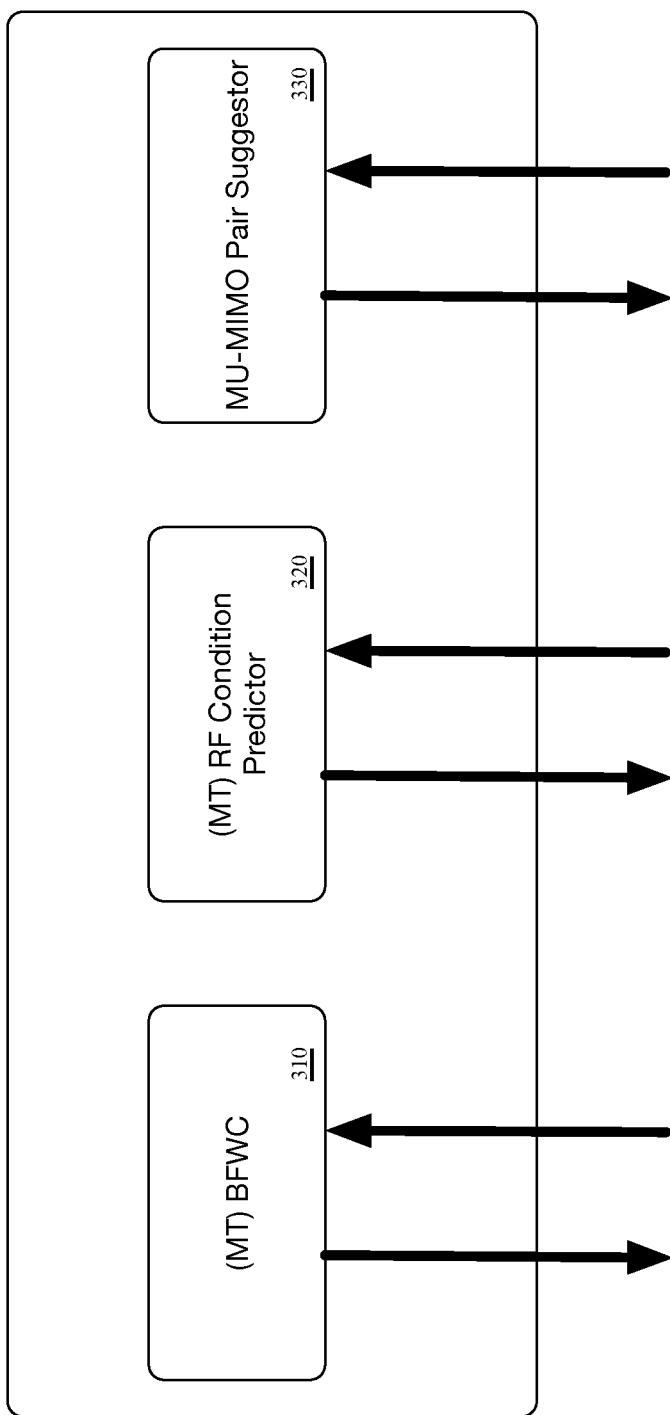
FIG. 3 illustrates a more in-depth view of a MAC control assistor of some embodiments.

FIG. 3 illustrates a more in-depth view of a MAC control assistor 300 of some embodiments. As illustrated, the MAC control assistor 300 includes a UE-specific beamforming weight calculator (BFWC) 310, a UE RF condition predictor 320, and a MU-MIMO pairing suggestor 330. The UE-specific BFWC 310 in some embodiments is based on UL SRS channel signal reception. In some embodiments, the MU-MIMO pairing suggestor 330 is for the MAC scheduler based on the UE-specific beams.

Each of the components 310-330 of the MAC control assistor 300 includes an uplink and a downlink, as shown. For the UE-specific BWC function, some embodiments expose a report interface for an uplink Sounding Reference Signal (UL SRS) channel response matrix that is an input to the weight calculation function and a control interface for a UE-specific beamforming weight matrix. For the UE RF condition predictor function, some embodiments expose a report interface for a downlink (DL) channel condition report that is an input to the RF condition prediction and a control interface for a predicted DL channel condition (e.g., including DL SINR, PMI, and rank) for the next scheduling window. For the MU-MIMO pairing suggestion function, some embodiments expose a report interface for UE-specific beamforming weight matrix that is an input to the pairing suggestion function and a control interface for UE pairing suggestion and SINR impact assessment.

Figure 4:
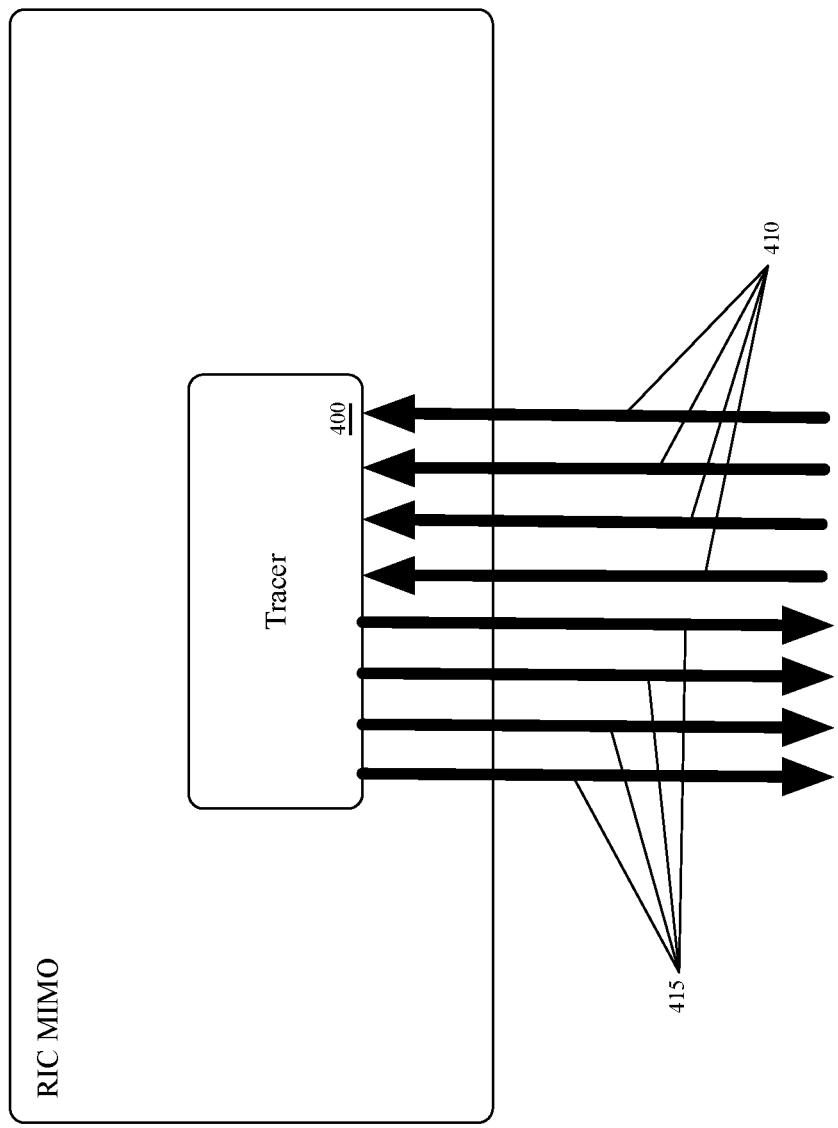
FIG. 4 illustrates a more in-depth view of a user-level tracer of some embodiments.

FIG. 4 illustrates a more in-depth view of a user-level tracer 400 of some embodiments. The tracer 400 includes multiple uplinks 410 and multiple downlinks 415 for performing tracing operations, in some embodiments. These operations produce L1/L2/L3 level information related to user configuration and traffic performance. This tracing data can be used as inputs to various control algorithms, including the MAC scheduler, parameter setting, etc. These tracing operations can (1) track user behavior in a cell, (2) track user RF condition, (3) track user data traffic performance in different layers (MAC, RLC, PDCP), and (4) track user RF resource consumption.

For these tracing operations, some embodiments expose report interfaces for the DU and/or the CU to provide various metrics to the user level tracing operations. These metrics can include selected RRC messages, MAC/RLC/PDCP traffic volume and performance, RF condition, and RF resource consumption. In some embodiments, messages over these interfaces to the RIC are triggered based on user behavior and/or periodic reporting (e.g., for traffic performance and RF condition/resource consumption).

The tracing operations track the various user data indicated above, and can provide this information either back to the RAN or to other control algorithms (e.g., other algorithms operating at the RIC). For instance, these algorithms might perform analysis on the user data performance from the user level tracing operations, determine that certain performance is inadequate, and modify how the RAN is treating the user traffic. Examples of control algorithms that can benefit from user-level tracing in some embodiments include (1) traffic steering, (2) quality of service (QoS) scheduling optimization, (3) user configuration adjustment, and (4) user behavior anomaly detection.

For all of the operations described in FIGS. 3-4 (i.e., the MAC scheduler functions and the user-level tracing operations), the increased computing power available to the RIC in the cloud enables more complex computations without excessive latency. For instance, some or all of these operations can be performed at the RIC using machine learning (e.g., using machine-trained networks, etc.).

Figure 5:
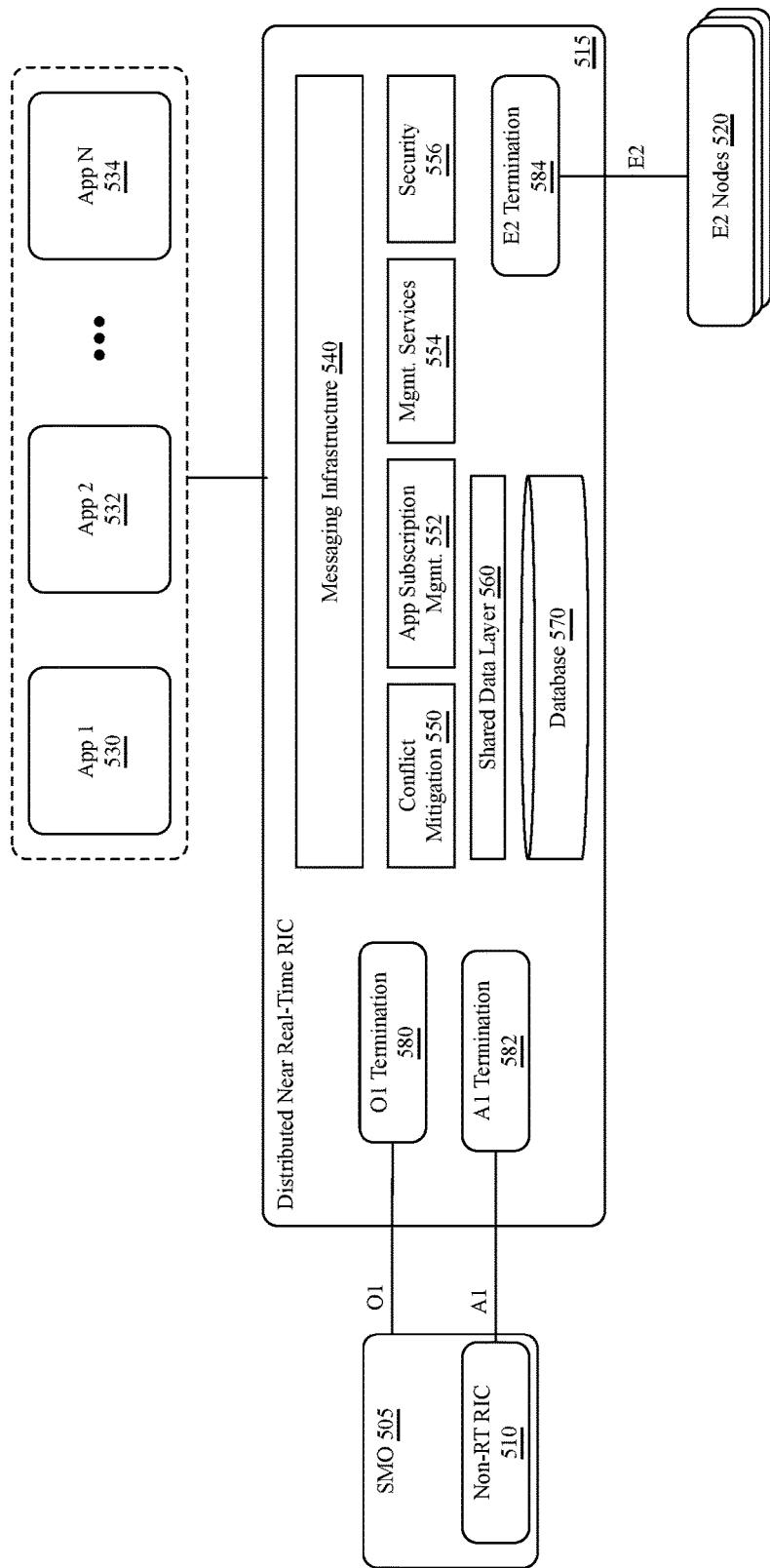
FIG. 5 illustrates another view of the O-RAN architecture of some embodiments, with a more in-depth view of the near real-time RIC.

FIG. 5 illustrates another view of the O-RAN architecture of some embodiments, with a more in-depth view of the near real-time RIC. The architecture 500 includes an SMO 505 with a non-real-time RIC 510, a distributed near real-time RIC 515, and E2 nodes 520 (e.g., O-DU and/or O-CU nodes). The distributed near real-time RIC 515 includes messaging infrastructure 540, a set of services (e.g., 550, 552, 554, and 556), a shared data layer 560, a database 570, and a set of termination interfaces (e.g., 580, 582, and 584). As shown, a set of embedded apps (e.g., 530, 532, and 534) uses this distributed near RT MC. As further described below, the distributed near RT RIC 515 is implemented by multiple RICs executing on multiple host computers in some embodiments.

As shown, the set of services include conflict mitigation services 550, app subscription management services 552, management services 554, and security services 556. Additionally, the set of termination interfaces include O1 termination interface 580 connecting the SMO to the near real-time RIC, A1 termination interface 582 connecting the non-real-time RIC to the near real-time RIC, and E2 termination interface 584 connecting the E2 nodes to the near real-time RIC. Each of the apps, in some embodiments, is representative of the various functions of the RIC that use data sent from the E2 nodes 520. For example, app 530 may correspond to the UE-specific BFWC 310 of the MAC control assistor 300, app 532 may correspond to the UE RF condition predictor 320 of the MAC control assistor 300, etc.

In some embodiments, the objective of the framework 500 is to offload near real-time functions that are computation-intensive, and provide results back to the O-DU (e.g., via the E2 interface with E2 nodes 520). The results, in some embodiments, can be used to assist or enhance the real-time decision in the MAC layer. Three example use-cases for the MAC control assistance framework, each example specific to a different component of the MAC control assistor (e.g., the UE-specific BFWC, the UE RF condition predictor, and the MU-MIMO pairing suggestor), and one use-case example for the user-level tracer, will be described below.

The first example use-case is specific to the UE-specific beamforming weight calculation based on UL SRS signal reception component of the MAC control assistance framework (e.g., component 310 of the MAC control assistor 300). In some embodiments of this use-case, the input metrics can include multiple options based on UL SRS, such as raw SRS received data, and an SRS channel responses matrix from a channel estimate.

The algorithm for producing output metrics, in some embodiments, evaluates the optimal beam-forming weights to reach the user. Some embodiments use traditional signal processing algorithms that are based on channel models. Alternatively, or conjunctively, machine-learning based algorithms that utilize raw data inputs are used, which require feedback from the DU in the E2 nodes 520.

In some embodiments, the output metrics resulting from the algorithm include a beam-form weight (BFW) matrix for the user. In some embodiments, the BFW could also be mapped to a beam index from a pre-designed beam set. The DU in some embodiments uses the matrix to control the MIMO antenna array gain/phasing in the RU (e.g., the O-RU 135 in the architecture 100) for user data transmission and reception.

The second use-case example is specific to the UE RF condition predictor component of the MAC control assistance framework (e.g., component 320 of the MAC control assistor 300). For this second use-case, the input metrics include at least a channel report from the UE, such as Wideband or Subband CQI/PMI/RI for DL, or SRS for UL, according to some embodiments. The input metrics of some embodiments can also opt to include supportive information such as UE distance, UE positioning, etc.

In some embodiments, the app algorithm for this second use-case is meant to predict the UE's RF condition based on the observation. Some embodiments utilize traditional signal processing algorithms based on channel and mobility models. Alternatively, or conjunctively, some embodiments also use machine learning based algorithms using data inputs and potentially other factors, such as site layout (which requires feedback from the DU).

The output metrics for this use-case, in some embodiments, include the predicted channel condition of the user for the next scheduling window, as well as predicted downlink and uplink SINR, a precoding matrix (e.g., if applicable), and SU-MIMO layers. In some embodiments, these output metrics are used by the DU for the user link adaptation on PDCCH/PDSCH/PUSCH transmissions.

The third use-case example is specific to the MU-MIMO pairing suggestor to MAC scheduler component (e.g., component 330 of the MAC control assistor 300). The input metrics for this example use case, in some embodiments, include at least the UE-specific BFW matrix and the UE RF condition estimate. Some embodiments may also include supportive metrics such as user data demand, etc., as input metrics in addition to the UE-specific BFW matrix and the UE RF condition estimate.

The app algorithm for this use-case, in some embodiments, is meant to identify users that can be paired for MU-MIMO operations. For example, some embodiments of the third use-case use traditional signal processing algorithms based on information theory and cross-channel covariance evaluation. Alternatively, or conjunctively, some embodiments use machine learning based algorithms using the data inputs, which again requires feedback from the DU.

In some embodiments, the output metrics of this third use-case can include UE pairing suggestions and an impact assessment on SINR and SU-MIMO layers. Additionally, the DU in some embodiments uses the output metrics to select users for RF scheduling, and to determine the transmission efficiencies.

An example use-case for the user-level tracer can include QoS scheduling optimization with the goal of adjusting a user's scheduling priority for an RF resource to optimize the service quality. The input for some embodiments of this use-case can include a service quality target from a user subscription. In some embodiments, the user-level tracing includes (1) tracking the user RF condition, (2) tracking the user data traffic performance in different layers (e.g., MAC/RLC/PDCP), and (3) tracking the user RF resource consumption.

In some embodiments, the app algorithm is based on the QoS target and observed user traffic performance, and can be used to determine that a user's resource allocation is insufficient. The algorithm format, in some embodiments, can be logic-based or machine learning-based. In some embodiments, the output can include a recommendation issued to the MAC scheduler to adjust the traffic priority or link adaptation in order to improve performance.

On each machine (e.g., each VM or Pod) that executes a control plane application, some embodiments configure a RIC SDK (software development kit) to serve as an interface between the control plane application on the machine and a set of one or more elements of the RAN. In some embodiments, the RIC SDK provides a set of connectivity APIs (e.g., a framework) through which applications can communicate with the distributed near real-time (RT) RIC implemented by two or more near real-time RICs. Examples of such applications include xApps, and other control plane and edge applications in some embodiments. In O-RAN, xApps perform control plane, monitoring and data processing operations. The discussion below regarding FIGS. 6 and 8-20 refers to control plane applications (e.g., 615, 815, 820, 915, 920, etc.). These control plane applications are xApps in an O-RAN system in some embodiments.

Figure 6:
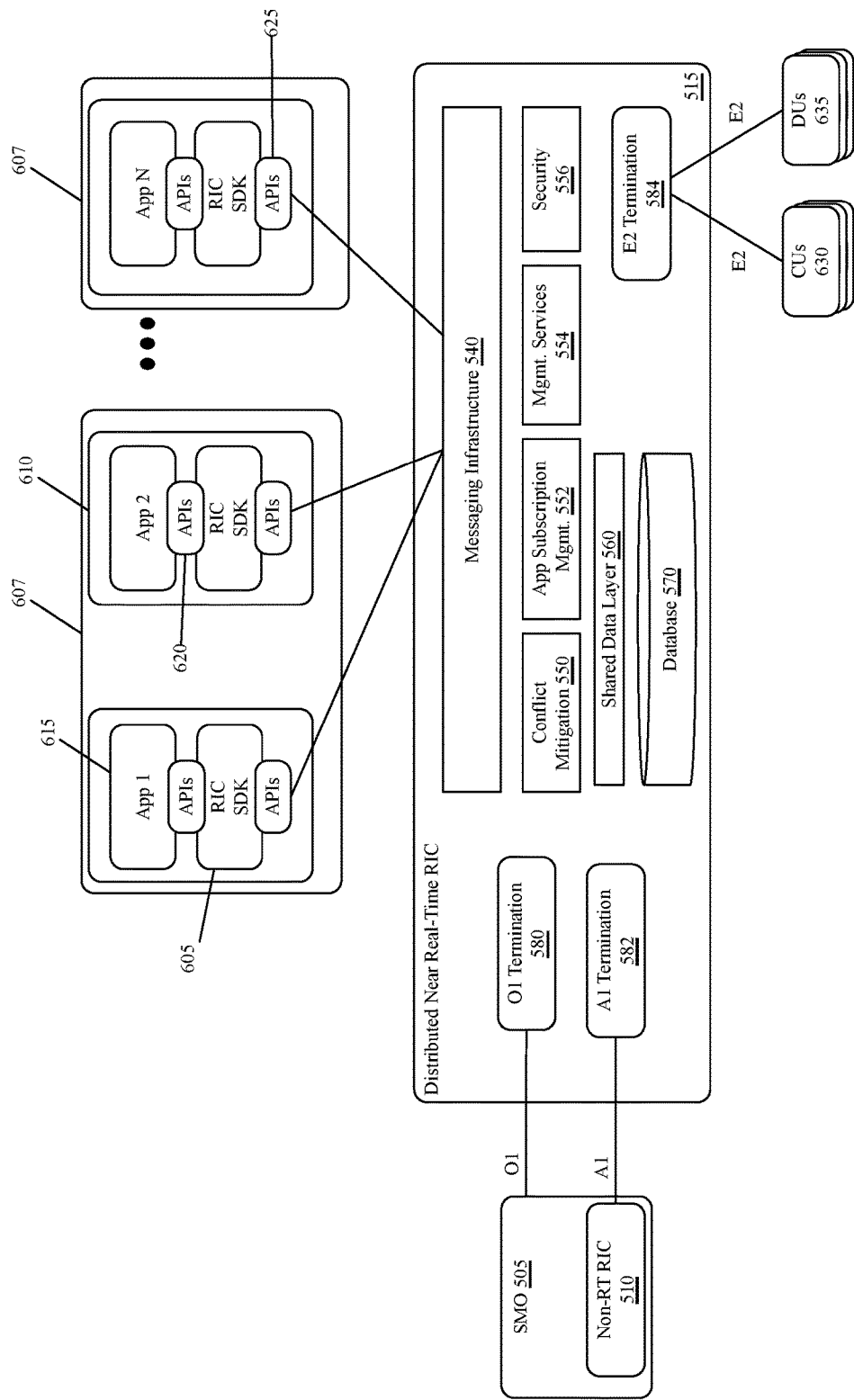
FIG. 6 illustrates deployment of RIC SDKs on machines that execute control plane applications in some embodiments.

FIG. 6 illustrates deployment of RIC SDKs 605 on machines 610 that execute control plane applications 615 in some embodiments. As shown, one or more machines 610 execute on each of several host computers 607 in one or more datacenters. In some embodiments, the MC SDK 605 on each machine 610 includes a set of network connectivity processes that establish network connections to the set of RAN elements (e.g., E2 nodes 520, shared data layer 560, management services 554, SMO 505, etc.) for the control plane application. The MC SDK processes allow the control plane application on their machine to forego performing network connectivity operations. In some embodiments, the set of network connectivity processes of each RIC SDK of each machine establishes and maintains network connections between the machine and the set of RAN elements used by the control plane application of the machine, and handles data packet transport to and from the set of RAN elements for the control plane application.

The control plane application on each machine communicates with the set of RAN elements through high-level APIs 620 that the RAN SDK converts into low-level APIs 625. In some embodiments, at least a subset of the low-level API calls 625 are specified by a standard specifying body. Also, in some embodiments, the high-level APIs 620 are made in a high-level programming language (e.g., C++), while the low-level API calls comprise low-level calls that establish and maintain network connections and pass data packets through these connections.

The set of RAN elements that the RIC SDK connects with the control plane application on its machine in some embodiments include RAN elements that are produced and/or developed by different RAN vendors and/or developers. These RAN elements include CUs 630 and DUs 635 of the RAN in some embodiments. Also, this SDK communicates with the CUs and DUs through the low-level, standard-specified E2 interface, while the control plane application on the machine uses high-level API calls to communicate with the CUs and DUs through the RAN SDK. In some embodiments, the high-level API calls specifying E2 interface operations at a high-level application layer that do not include low-level transport or network operations.

Figure 7:
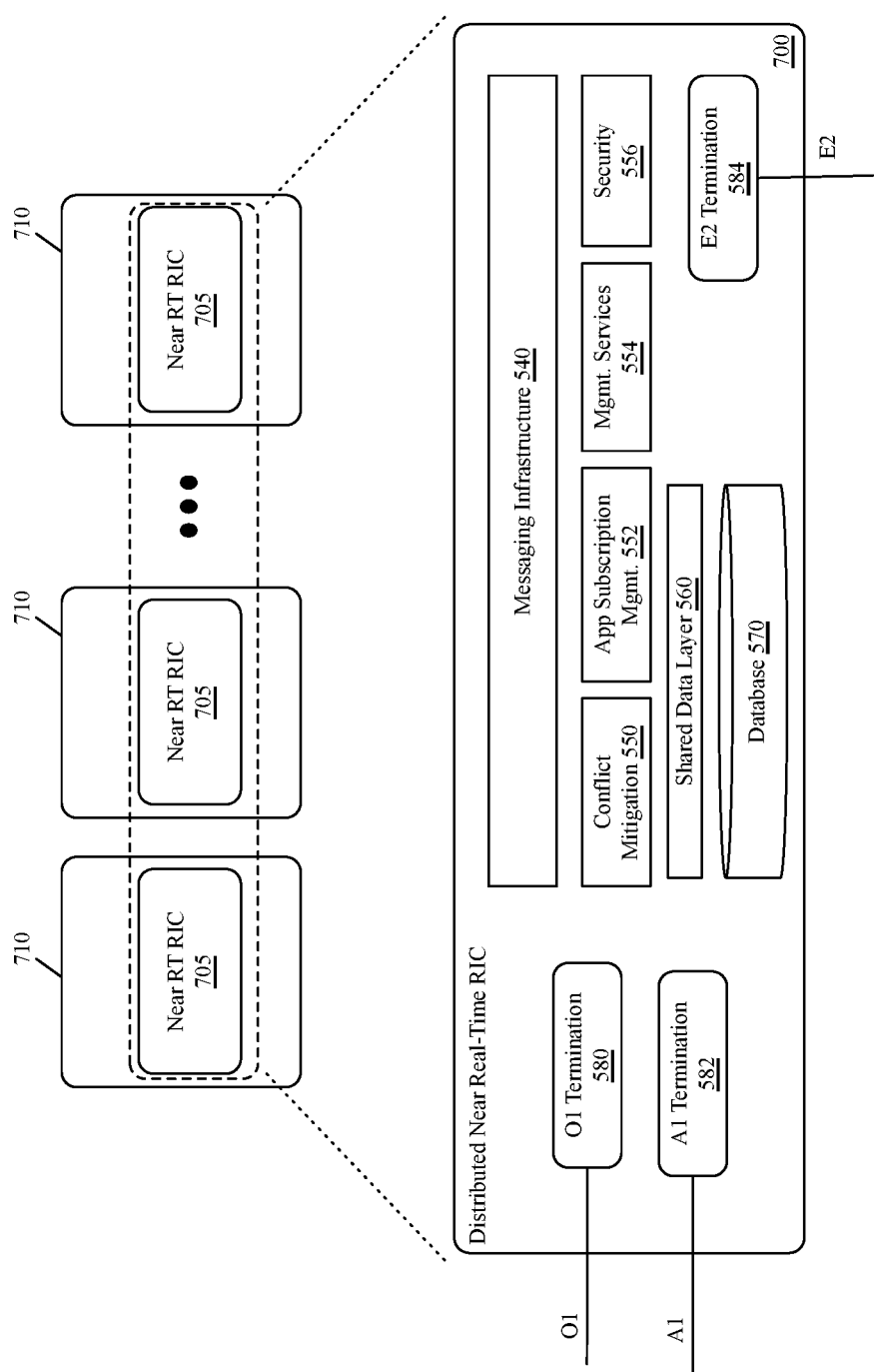
FIG. 7 illustrates that some embodiments deploy several RICs to execute on several host computers to implement a distributed near RT RIC that includes the RIC components illustrated in FIGS. 5 and 6.

Conjunctively, or alternatively, the set of RAN elements that the RIC SDK connects with the control plane application 615 on its machine 610 include network elements of the RIC. Again, these network elements in some embodiments include RAN elements that are produced and/or developed by different RAN vendors and/or developers. These RIC elements in some embodiments include shared data layer (SDL) 560, datapath input/output (I/O) elements, and application and management services 552 and 554 in some embodiments. FIG. 7 illustrates that some embodiments deploy several near RT RICs 705 to execute on several host computers to implement a distributed near RT RIC 700 that includes the RIC components illustrated in FIGS. 5 and 6. In some embodiments, one RIC 705 executes on each host computer that also executes a control plane application 615. In other embodiments, a control plane application 615 can execute on a host computer that does not execute a MC. For instance, in some embodiments, one or more control plane applications execute on one or more host computers that have graphics processing units (GPUs), while RICs do not execute on such host computers as they do not need the processing power of the GPUs.

Through the distributed near RT RIC, the RIC SDK also connects its control plane application to other control plane applications executing on other machines. In other words, the RIC SDK and the distributed near RT RIC in some embodiments serve as communication interface between the control plane applications. In some embodiments, the different control plane applications are developed by different application developers that use the common set of RIC APIs to communicate with each other through the distributed near RT RIC. In some of these embodiments, the distributed near RT RIC adds one or more parameters to the API calls as it forwards the API calls from one control application to the other control application.

Figure 8:
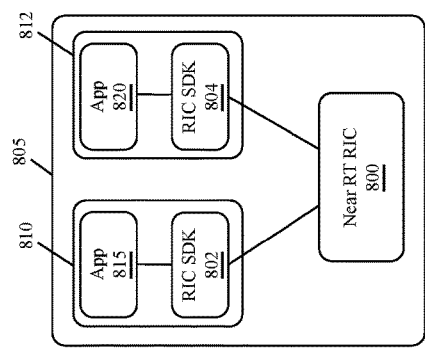
FIG. 8 illustrates a RIC that executes on one host computer along with two machines on which two control plane applications execute.

FIGS. 8-11 illustrate several examples of RIC architectures in which the RIC SDK and the distributed near RT RIC establish the communication interface between control plane applications. These architectures are mutually exclusive in some embodiments, while in other embodiments two or more of these architectures are used conjunctively. FIG. 8 illustrates a RIC 800 that executes on one host computer 805 along with two machines 810 and 812 on which two control plane applications 815 and 820 execute. Through the RIC SDKs 802 and 804 executing on the machines 810 and 812, the RIC 800 receives API calls from the CP application 815 and forwards the API calls to the CP application 820, and passes responses to these API calls from the second CP application 820 to the first CP application 815. It also passes API calls from the second CP application 820 to the first CP application 815, and responses from the first CP application 815 to the second CP application 820.

Figure 9:
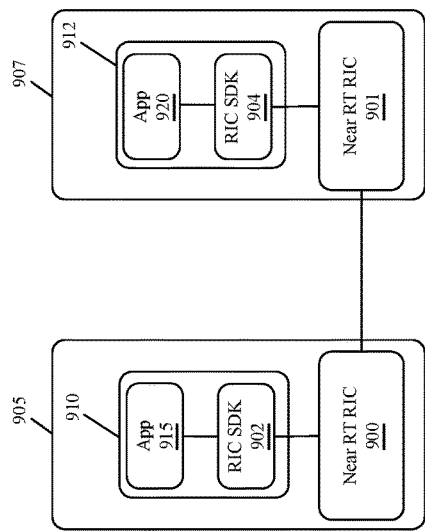
FIG. 9 illustrates two RICs that execute on two host computer along with two machines on which two control plane applications and two RIC SDKs execute.

FIG. 9 illustrates two RICs 900 and 901 that execute on two host computer 905 and 907 along with two machines 910 and 912 on which two control plane applications 915 and 920 and two RIC SDKs 902 and 904 execute. As shown, API calls from the first CP application 915 to the second CP application 920 are forwarded through the first MC SDK 902, the first MC 900, the second RIC 901 and the second MC SDK 904. The second CP application's responses to these API calls to the first CP application 915 traverse the reverse path, from the second RIC SDK 904, the second MC 901, the first RIC 900, and the first MC SDK 902.

The API calls from second CP application 920 to the first CP application 915 are forwarded through the second MC SDK 904, the second MC 901, the first RIC 900, and the first MC SDK 902, while responses to these API calls from the first CP application 915 to the second CP application 920 are forwarded through the first RIC SDK 902, the first RIC 900, the second MC 901 and the second MC SDK 904.

Figure 10:
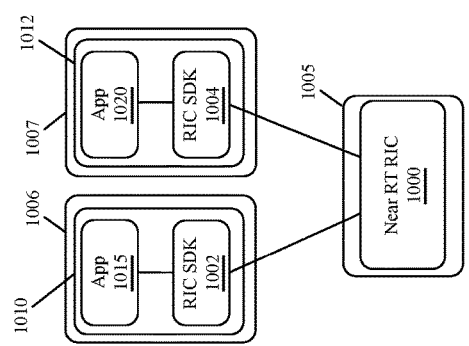
FIG. 10 illustrates a RIC that executes on a first host computer to connect two control plane applications that execute on two machines operating on two other host computers.

FIG. 10 illustrates a RIC 1000 that executes on first host computer 1005 to connect two control plane applications 1015 and 1020 that execute on two machines 1010 and 1012 operating on two other host computers 1006 and 1007. Through the RIC SDKs 1002 and 1004 executing on the machines 1010 and 1012, the MC 1000 receives API calls from the CP application 1015 and forwards the API calls to the CP application 1020, and passes responses to these API calls from the second CP application 1020 to the first CP application 1015. It also passes API calls from the second CP application 1020 to the first CP application 1015, and responses from the first CP application 1015 to the second CP application 1020.

Figure 11:
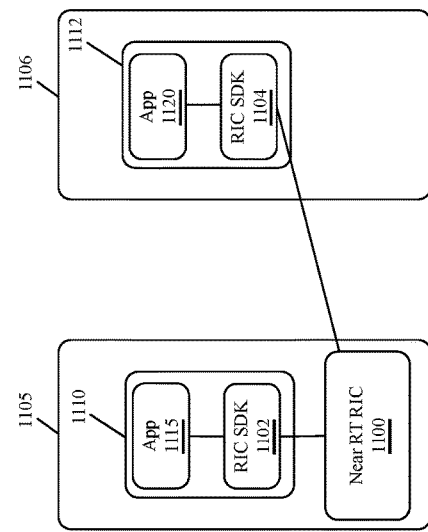
FIG. 11 illustrates a RIC that executes on a first host computer to connect two control plane applications that execute on two machines, one of which operates on the first host computer while the other operates on another host computer.

FIG. 11 illustrates a MC 1100 that executes on first host computer 1105 to connect two control plane applications 1115 and 1120 that execute on two machines 1110 and 1112 one of which operates on host computer 1105 while the other operates on host computer 1106. Through the RIC SDKs 1102 and 1104 executing on the machines 1110 and 1112, the MC 1100 receives API calls from the CP application 1115 and forwards the API calls to the CP application 1120, and passes responses to these API calls from the second CP application 1120 to the first CP application 1115. Through these SDKs 1102 and 1104, the MC 1100 also passes API calls from the second CP application 1120 to the first CP application 1115, and responses from the first CP application 1115 to the second CP application 1120.

Figure 12:
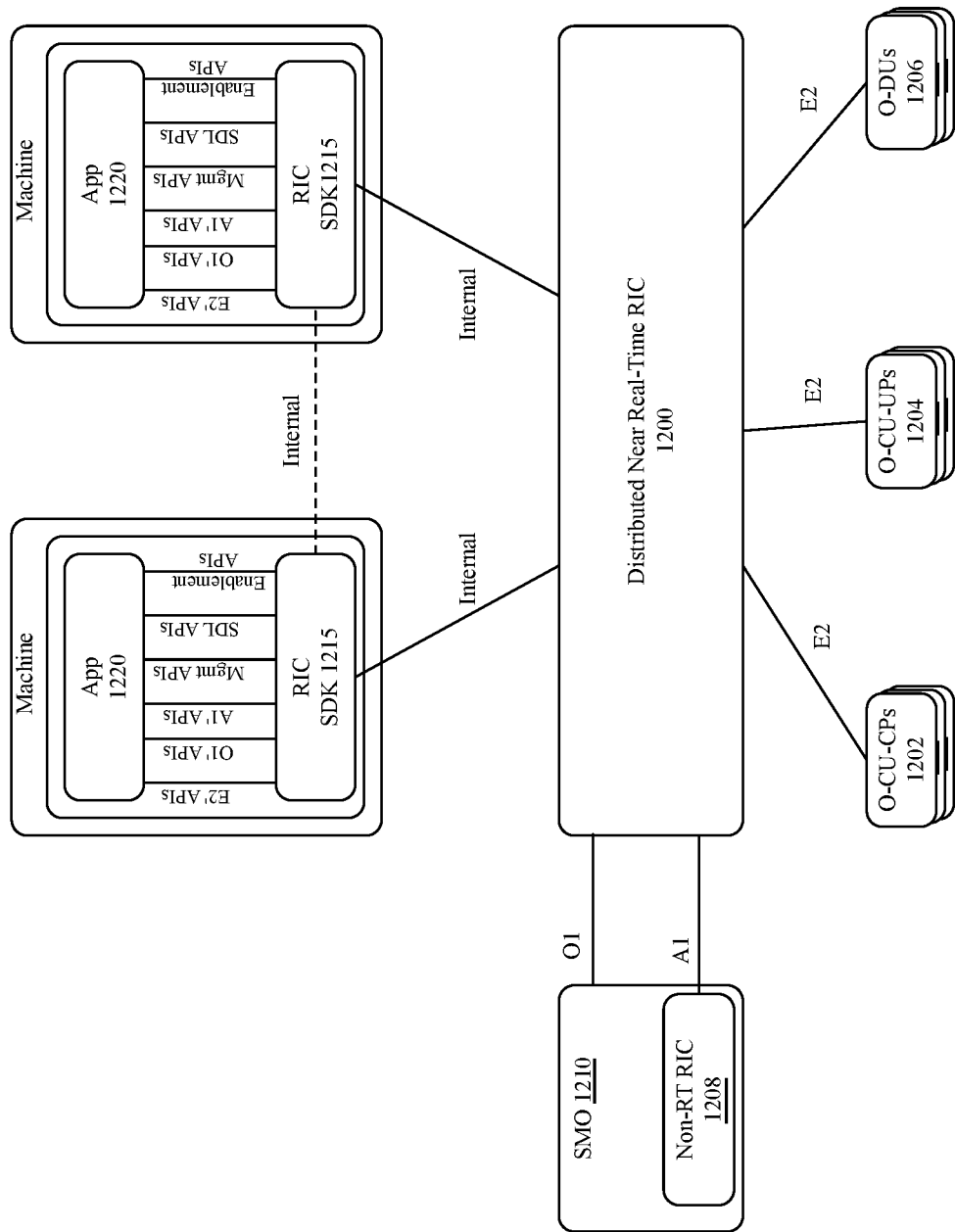
FIG. 12 illustrates examples of the different standard specified APIs that the distributed near RT RIC platform of some embodiments supports.

FIG. 12 illustrates examples of the different standard specified APIs that the distributed near RT MC platform of some embodiments supports. As shown, the distributed near RT MC platform 1200 in some embodiments uses the E2, O1, and A1 interfaces specified by the O-RAN standard specifying body. It uses the E2 APIs to communicate with the E2 O-RAN nodes, such as the O-CU-CPs 1202, O-CU-UPs 1204, and O-DUs 1206. It also uses the A1 APIs to communicate with the non-real-time RIC platform 1208, and uses the O1 APIs to communicate the SMO 1210.

For each of these E2, A1, and O1 APIs, the MC SDKs 1215 provide high-level counterpart APIs for the control plane applications 1220 that use the MC SDKs and the distributed near RT RIC platform to communicate with the E2 nodes 1202-1206, the non-real-time MC platform 1208 and the SMO 1210. FIG. 12 designates these high-level counterpart APIs for the E2, O1, and A1 interfaces with a prime sign as the E2' API calls, O1' API calls and A1' API calls. These high-level counterpart APIs are not specified by a standard body, but are APIs that the MC SDK and/or distributed near RT MC convert into standard specified API calls.

FIG. 12 also shows several internal-RIC APIs for allowing the control plane applications 1220 to communicate with each other through the RIC SDKs and the distributed near RT RIC, and to communicate with one or more elements of the distributed near RT RIC (e.g., shared data layer (SDL) 560, datapath input/output (I/O) elements, and application and management services 552 and 554).

Enablement APIs are the APIs that are used in some embodiments to allow the control plane applications 1220 to communicate with each other. As described above by reference to FIGS. 8-11, these APIs are passed through the distributed near RT RIC in some embodiments. In other embodiments, these APIs allow the RIC SDKs of the control plane applications to directly communicate with each other without traversing through any other components of the distributed near RT RIC. For this reason, FIG. 12 includes a dashed bi-directional arrow between the RIC SDKs 1215 of the two control plane applications 1220 to indicate that in some embodiments the RIC SDKs 1215 of these applications communicate directly with each other.

The enablement APIs in some embodiments include registration APIs, service discovery APIs as well as inter-app communication APIs. Registration APIs are used by the applications 1220 (e.g., xApps) to introduce themselves to other applications 1220 by providing their network identifiers (e.g., their network address and available L4 ports) and providing their functionality (e.g., performing channel prediction). Service discovery APIs allow control plane applications 1220 (e.g., xApps) to query the service directory (e.g., of the distributed near RT RIC) for other control plane applications (e.g., other xApps) that provide a particular service. The inter-app communication APIs allow the control plane applications to communicate with each other to pass along data and/or request certain operations.

Some embodiments deploy an SDL cache on the same host computer as a control plane application, and use this cache to process at least a subset of the SDL storage access requests of the control plane application. In some embodiments, the control plane application and the SDL cache operate on a machine that executes on the host computer. In other embodiments, the SDL cache operates on the same host computer but outside of the machine on which the control plane application executes. In some of these embodiments, multiple control plane applications executing on the same host computer use a common SDL cache on that host computer.

The SDL cache is part of a MC that executes on the same host computer as the control plane application in some embodiments. In other embodiments, the SDL cache is part of the RIC SDK that executes on the same machine as the control plane application. In either of these embodiments, a synchronizing process of the RIC or the RIC SDK synchronizes the data stored in the SDL cache with the data stored in the SDL storage.

In some embodiments, the SDL storage operates on a different host computer than the host computer on which the control plane application executes, while in other embodiments at least a portion of the SDL storage operates on the same host computer on which the control plane application executes. Also, in some embodiments, the RIC or the RIC SDK forwards SDL access requests from the control plane application to the SDL storage when the RIC SDK cannot process the SDL access requests through the SDL cache. For instance, the RIC or the RIC SDK cannot process SDL access requests through the SDL cache when the SDL cache does not store data requested by the control plane application.

Figure 13:
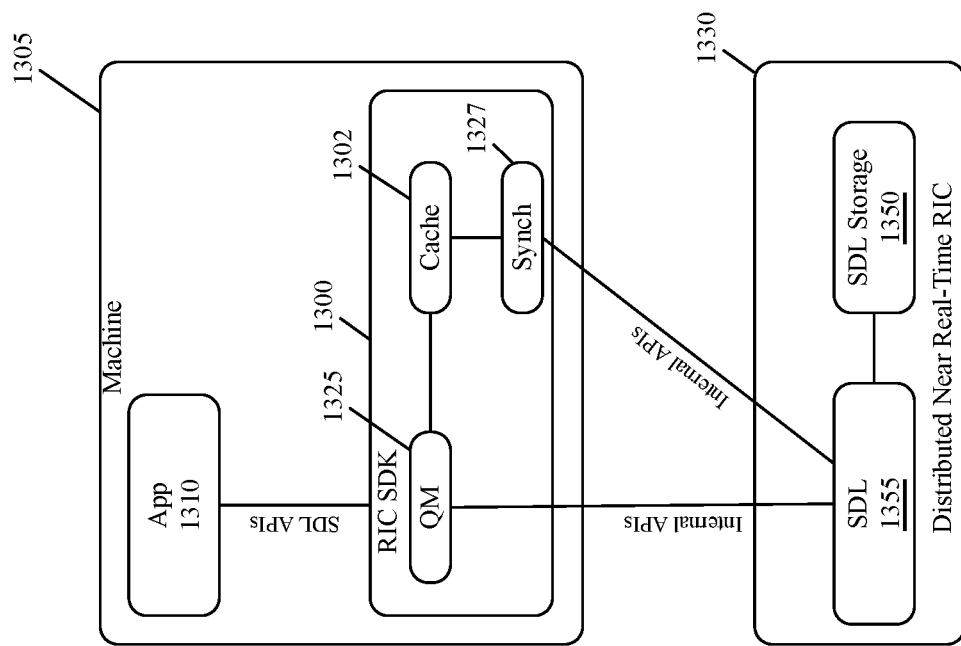
FIG. 13 illustrates embodiments in which the SDL cache is part of each RIC SDK that executes on the same machine as its control plane application.

FIG. 13 illustrates embodiments in which the SDL cache 1302 is part of each RIC SDK 1300 that executes on the same machine 1305 as its control plane application 1310. As shown, the RIC SDK 1300 includes a query manager 132 that processes SDL requests from the CP application 1310 and a synchronizing service 1327 that synchronizes the data stored in the SDL cache with the data stored in an SDL storage 1350 of the SDL 1355 of the distributed near RT RIC 1330. In this example, the SDL storage 1350 operates on a different host computer than the host computer on which the control plane application 1310 executes. However, in other embodiments, at least a portion of the SDL storage 1350 operates on the same host computer on which the control plane application 1310 executes.

When the control plane application 1310 uses a high-level API call to read or write data to the SDL storage, the query manager 1325 of the RIC SDK 1300 first determines whether the data record being read or written is stored in the SDL cache 1302. If so, the query manager 1325 reads from or write to this record. When this operation is a write operation, the synchronizing service 1327 writes the new data in real-time or on batch basis to the SDL storage 1350. On the other hand, when query manager 1325 of the RIC SDK 1300 determines that the data record being read or written is not stored in the SDL cache 1302, it passes the API call to the SDL layer of the distributed near RT MC to perform the requested read or write operation. When passing this API call, the MC SDK 1300 modifies the format of this call and/or modifies the parameters supplied with this call in some embodiments.

Figure 14:
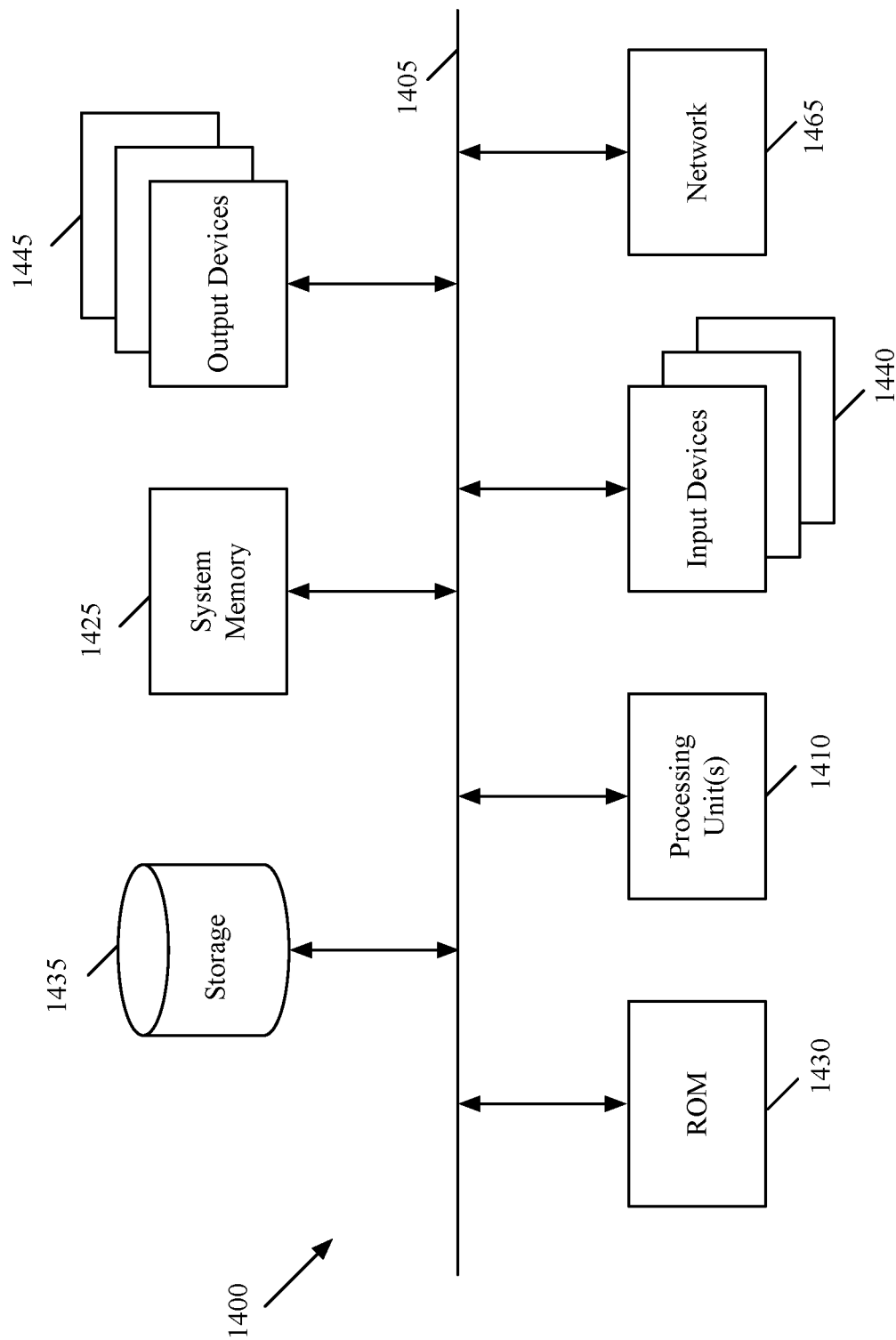
FIG. 14 conceptually illustrates an electronic system with which some embodiments of the invention are implemented.

FIG. 14 conceptually illustrates an electronic system 1400 with which some embodiments of the invention are implemented. The electronic system 1400 may be a computer (e.g., a desktop computer, personal computer, tablet computer, server computer, mainframe, a blade computer etc.), or any other sort of electronic device. Such an electronic system includes various types of computer readable media and interfaces for various other types of computer readable media. Electronic system 1400 includes a bus 1405, processing unit(s) 1410, a system memory 1425, a read-only memory 1430, a permanent storage device 1435, input devices 1440, and output devices 1445.

The bus 1405 collectively represents all system, peripheral, and chipset buses that communicatively connect the numerous internal devices of the electronic system 1400. For instance, the bus 1405 communicatively connects the processing unit(s) 1410 with the read-only memory 1430, the system memory 1425, and the permanent storage device 1435.

From these various memory units, the processing unit(s) 1410 retrieve instructions to execute and data to process in order to execute the processes of the invention. The processing unit(s) may be a single processor or a multi-core processor in different embodiments.

The read-only-memory (ROM) 1430 stores static data and instructions that are needed by the processing unit(s) 1410 and other modules of the electronic system. The permanent storage device 1435, on the other hand, is a read-and-write memory device. This device is a non-volatile memory unit that stores instructions and data even when the electronic system 1400 is off. Some embodiments of the invention use a mass-storage device (such as a magnetic or optical disk and its corresponding disk drive) as the permanent storage device 1435.

Other embodiments use a removable storage device (such as a floppy disk, flash drive, etc.) as the permanent storage device. Like the permanent storage device 1435, the system memory 1425 is a read-and-write memory device. However, unlike storage device 1435, the system memory is a volatile read-and-write memory, such a random-access memory. The system memory stores some of the instructions and data that the processor needs at runtime. In some embodiments, the invention's processes are stored in the system memory 1425, the permanent storage device 1435, and/or the read-only memory 1430. From these various memory units, the processing unit(s) 1410 retrieve instructions to execute and data to process in order to execute the processes of some embodiments.

The bus 1405 also connects to the input and output devices 1440 and 1445. The input devices enable the user to communicate information and select commands to the electronic system. The input devices 1440 include alphanumeric keyboards and pointing devices (also called "cursor control devices"). The output devices 1445 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 14, bus 1405 also couples electronic system 1400 to a network 1465 through a network adapter (not shown). In this manner, the computer can be a part of a network of computers (such as a local area network ("LAN"), a wide area network ("WAN"), or an Intranet, or a network of networks, such as the Internet. Any or all components of electronic system 1400 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. For instance, a number of the figures conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

Also, several embodiments described above only show one hardware accelerator per host computer. However, one of ordinary skill will realize that the methodology and architecture of some embodiments can be used to provide direct, passthrough access to multiple hardware accelerators on one host computer. Thus, one of ordinary skill in the art would understand that the invention is not to be limited by the foregoing illustrative details, but rather is to be defined by the appended claims.

We claim:

1. A method for a control plane application to use a shared data layer (SDL) storage of a radio access network (RAN) intelligent controller (MC) of a RAN, which comprises a plurality of central units (CUs) and a plurality of distributed units (DUs), the method comprising:
    deploying the control plane application to execute on a host computer to communicate through the MC with one or more CUs or DUs of the RAN;
    deploying an SDL cache on the host computer in order to store in the SDL cache data retrieved from the SDL storage of the RIC; and
    using the SDL cache to process at least a subset of the—SDL storage access requests of the control plane application.

2. The method of claim 1, wherein the control plane application executes on a machine that executes on the host computer, and the SDL cache executes on the machine.

3. The method of claim 1, wherein the control plane application executes on a machine that executes on the host computer, and the SDL cache executes on the host computer.

4. The method of claim 1, wherein the RIC synchronizes data stored in the SDL cache with data stored in the SDL storage.

5. The method of claim 4, wherein the MC implements a distributed RIC along with other RICs executing on other host computers.

6. The method of claim 5, wherein the SDL storage operates on a different host computer than the host computer on which the control plane application executes.

7. The method of claim 5, wherein at least a portion of the SDL storage operates on the host computer on which the control plane application executes.

8. The method of claim 1, wherein the control plane application executes on a machine that execute on the host computer, the method further comprising configuring a RIC software development kit (SDK) on the machine to process storage access requests from the control plane application.

9. A method for a control plane application to use a shared data layer (SDL) storage of a radio access network (RAN), the method comprising:
deploying the control plane application to execute on a host computer;
deploying an SDL cache on the host computer, wherein the SDL cache is part of a RAN Intelligent Controller (MC) Software Development Kit (SDK) that serves as an interface between the control plane application and a set of one or more RAN elements including at least one of a central unit (CU) and a distributed unit (DU) of the RAN, said MC SDK providing a set of connectivity API (Application Programming Interface) commands through which the control plane application communicate with the set of one or more RAN elements; and
using the SDL cache to process at least a subset of SDL storage access requests of the control plane application.

10. The method of claim 9, wherein
the MC SDK interfaces with a MC that executes on another host computer to implement a distributed MC along with other RICs executing on a set of host computers, and
the SDL storage is part of the distributed MC.

11. The method of claim 10, wherein the RIC SDK forwards SDL access requests from the control plane application to the SDL storage when the RIC SDK cannot process the SDL access requests through the SDL cache.

12. The method of claim 11, wherein the RIC SDK cannot process SDL access requests through the SDL cache when the SDL cache does not store data requested by the control plane application.

13. A non-transitory machine readable medium storing a program which when executed by at least one processing unit for a control plane application to use a shared data layer (SDL) storage of a radio access network (RAN) intelligent controller (MC) of a RAN, which comprises a plurality of central units (CUs) and a plurality of distributed units (DUs), the program comprising sets of instructions for comprising:
deploying the control plane application to execute on a host computer to communicate through the MC with one or more CUs or DUs of the RAN;
deploying an SDL cache on the host computer in order to store in the SDL cache data retrieved from the SDL storage of the MC; and
using the SDL cache to process at least a subset of SDL storage access requests of the control plane application.

14. The non-transitory machine readable medium of claim 13, wherein the control plane application executes on a machine that executes on the host computer, and the SDL cache executes on the machine.

15. The non-transitory machine readable medium of claim 13, wherein the control plane application executes on a machine that executes on the host computer, and the SDL cache executes on the host computer.

16. The non-transitory machine readable medium of claim 13, wherein the program further comprises a set of instructions for deploying the RIC to execute on the host computer and to synchronize the data stored in the SDL cache with the data stored in the SDL storage.

17. The non-transitory machine readable medium of claim 16, wherein the set of instructions for deploying the RIC comprises a set of instructions for deploying the RIC to implement a distributed RIC along with other RICs executing on other host computers.

18. The non-transitory machine readable medium of claim 17, wherein the SDL storage operates on a different host computer than the host computer on which the control plane application executes.

19. The non-transitory machine readable medium of claim 17, wherein at least a portion of the SDL storage operates on the host computer on which the control plane application.

20. The non-transitory machine readable medium of claim 13, wherein the control plane application executes on a machine that execute on the host computer, the program further comprises a set of instructions for configuring a RIC software development kit (SDK) on the machine to process storage access requests from the control plane application.

* * * * *